United States Patent [19]

Krache

[11] Patent Number: 4,775,082
[45] Date of Patent: Oct. 4, 1988

[54] SCUBA DIVING CATCH BAG

[76] Inventor: John C. Krache, 11160 Holly Rd. NW., Bremerton, Wash. 98132

[21] Appl. No.: 846,848

[22] Filed: Apr. 1, 1986

Related U.S. Application Data

[63] Continuation of Ser. No. 661,124, Oct. 15, 1984, abandoned.

[51] Int. Cl.[4] .............................................. A45F 3/14
[52] U.S. Cl. ..................................... 224/219; 224/920
[58] Field of Search .................... 43/55, 54.1; 224/219, 224/921, 920, 103, 222; 220/229, 256; 215/323, 325, 354

[56] References Cited

U.S. PATENT DOCUMENTS

| | | |
|---|---|---|
| 2,241,314 | 5/1941 | Mohler . |
| 2,620,588 | 12/1952 | Critser ..................................... 43/55 |
| 2,679,960 | 6/1954 | Lowe ............................... 224/920 X |
| 2,722,770 | 11/1955 | Giordano . |
| 2,732,653 | 1/1956 | McGee . |
| 2,756,912 | 7/1956 | Armstrong ..................... 224/920 X |
| 2,902,195 | 9/1959 | Marshall ......................... 224/920 X |
| 3,025,629 | 3/1962 | Sears . |
| 3,086,674 | 4/1963 | Scheuerman ....................... 220/229 |
| 3,116,927 | 1/1964 | Kuhlman ........................ 220/229 X |
| 3,143,263 | 8/1964 | Farmer . |
| 3,315,402 | 4/1967 | Scott et al. ............................. 43/55 |
| 3,674,188 | 7/1972 | Anderson ....................... 224/921 X |
| 3,988,853 | 11/1976 | Hudkins ................................. 43/55 |
| 4,170,196 | 10/1979 | Yoneya ..................................... 119/3 |
| 4,322,077 | 3/1982 | Van't hof ....................... 224/219 X |
| 4,328,904 | 5/1982 | Iverson .......................... 220/229 X |
| 4,427,110 | 1/1984 | Shaw, Jr. ....................... 220/229 X |
| 4,429,659 | 2/1984 | Holyoak ................................. 119/3 |
| 4,481,977 | 11/1984 | Maldavs ......................... 220/229 X |
| 4,498,190 | 2/1985 | Garlick, III ..................... 43/55 X |

Primary Examiner—Henry J. Recla
Assistant Examiner—Robert M. Petrik
Attorney, Agent, or Firm—Harry M. Cross, Jr.

[57] ABSTRACT

A catch bag has a flat lid of resilient material which is hinged to a frame around the opening of the bag. A diametrical slit in the lid allows easy insertion of articles, such as speared fish, with one hand while the lid retains articles securely inside the bag. When access to the contents of the bag is desired, the hinged lid facilitates emptying of the bag. An elastic wrist cord opposite the hinge can be used to keep the bag near at hand while leaving the user's hand free, and also to hold the hinged lid shut. A carrying handle is attached along a side of the bag for convenient transporting of the bag on dry land.

4 Claims, 1 Drawing Sheet

U.S. Patent
Oct. 4, 1988
4,775,082
FIG. 1
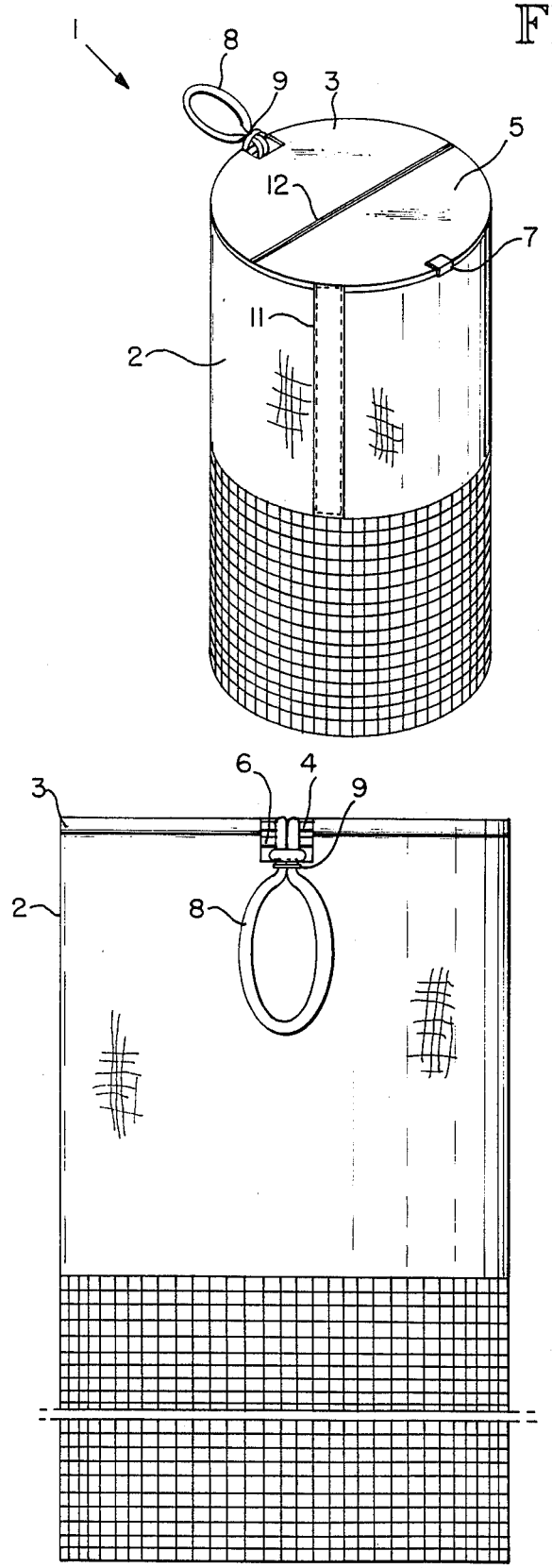
FIG. 2
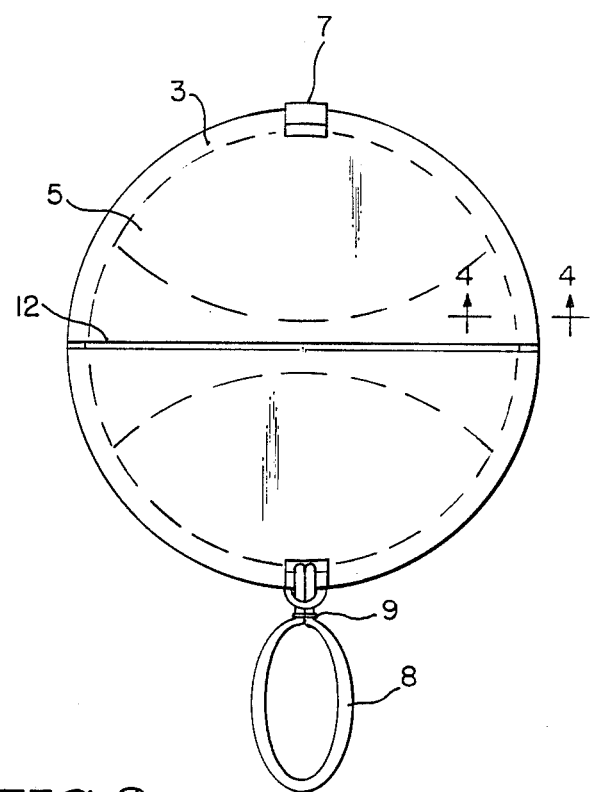
FIG. 3
FIG. 4
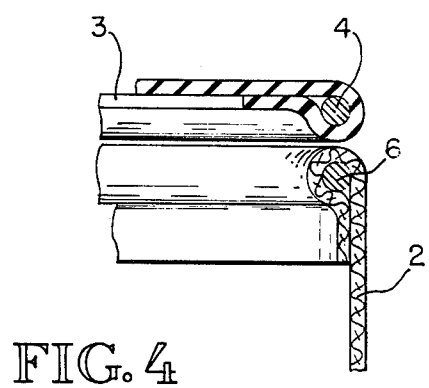

SCUBA DIVING CATCH BAG

This application is a continuation, of application Ser. No. 661,124, filed Oct. 15, 1984, now abandoned.

FIELD OF THE INVENTION

This invention relates to the field of receptacles, and more specifically to the field of bags for receiving and holding fish or the like in an underwater environment.

BACKGROUND OF THE INVENTION

The underwater scuba diver engaged in spearfishing needs a receptacle to hold his catch or other articles during his underwater activities. Many prior art catch bags are cumbersome, bulky, or of limited capacity.

Because a scuba diver usually needs at least one free hand in order to maneuver underwater and manipulate his equipment, it is most desirable to have a catch bag for which insertion of fish or other articles is a one-handed operation. It is likewise desirable to have a bag which holds its contents securely inside, even while additional articles are being inserted. Emptying of the bag when desired, however, should be a quick operation. And, the bag should have an ample capacity yet take up little room when empty.

SUMMARY OF THE INVENTION

A catch bag is provided with a flat lid of resilient material which is hinged to a frame around the opening of the bag. A slit in the lid allows easy insertion of articles, such as speared fish, with one hand while the lid retains articles securely inside the bag. Articles can be inserted in the bag with one hand because no manipulation of the lid is required.

When access to the contents of the bag is desired, the hinged lid facilitates emptying of the bag. A wrist cord opposite the hinge can be used to keep the bag near at hand while leaving the user's hand free, and also to hold the hinged lid shut. A carrying handle may be attached along a side of the bag for convenient transporting of the bag on dry land.

BRIEF DESCRIPTION OF THE DRAWINGS

FIG. 1 is a perspective view of a preferred embodiment of the invention with the lid shut and secured;

FIG. 2 is a top plan view of the embodiment of FIG. 1;

FIG. 3 is a side view of the embodiment of FIG. 1; and

FIG. 4 is a sectional view taken along lines 4—4 of FIG. 2.

DETAILED DESCRIPTION OF THE PREFERRED EMBODIMENT

Referring to FIGS. 1 and 3, a catch bag 1 is formed of a receptacle 2 with a lid 3. The receptacle 2 is cylindrical and is closed at one end. In a preferred embodiment, the upper half to two-thirds of the receptacle 2 will be made from a PVC fabric or other non-porous, flexible material, while the lower one-third to one-half will be made from a nylon mesh or other open mesh fabric. This allows water to flow freely through the receptacle 2, ensuring its maneuverability underwater and keeping the fish stored therein fresh.

As shown in FIGS. 2 and 4, the lid 3 is constructed of a sheet of non-porous, resilient material 5, such as 1/16-inch-thick rubber of the type used for inner tubes, or a neoprene rubber, which is secured to a rigid circumferential frame 4 which holds the material taut. The frame 4 is preferably formed from a zinc-plated steel rod approximately 36 inches long bent into a circular configuration and encased in a peripheral hem provided in the lid material 5. A second frame 6 of the same shape, dimensions, and material as the lid frame 4 is encased in a hem around the opening of the receptacle 2, to form a circular opening therein. The lid 3 is hinged to the receptacle 2 by a hinge clip 7 which pivotally secures the lid frame 4 to the receptacle frame 6 at a single point. Portions of the lid material 5 and receptacle material adjacent their respective frames 4 and 6 are cut out to accommodate the hinge clip 7.

At the side of the lid 3 and receptacle 2 opposite the hinge clip 7, another portion of the lid and receptacle material is cut out to accommodate a wrist cord 8 which serves the dual purpose of acting as a securement for the lid 3 and as a means for grasping or keeping the bag 1 close at hand. An 18-inch-long piece of surgical tubing, 3/16 to ⅜ inch in diameter, or a strip of similar elastic material held in a closed loop by a wire clip 9 is especially advantageous for use as a wrist cord 8. One end of the wrist cord 8 can be looped around the lid frame 4 and receptacle frame 6, while the other end serves as a loop which can be grasped or worn about the wrist. The elasticity of such a wrist cord 8 ensures that an underwater diver can quickly free himself from the bag 1, if necessary, thus eliminating the safety hazard of becoming entangled to a weighted bag.

The material 5 of lid 3 of the present invention has a diametric slit 12 forming an elongated, narrow opening which preferably runs perpendicular to a line connecting the hinge clip 7 and wrist cord 8. The rigid frame-resilient lid material combination maintains the adjacent edges of the material forming slit 12 to abut one another in a normally closed condition. Because of the resiliency of the material 5, the edges of the slit 12 can be forced apart by lateral deflection of the material 5 to open the slit 12 by pushing an article into the bag 1 and will automatically snap closed behind the article. For example, a fish on a spear can be pushed through the slit 12, which will close behind the fish to retain it inside the bag 1 while the spear is pulled out. This allows a user to insert catch or other articles into the bag 1 with only one hand, since no clasps or the like need be undone. As indicated in dotted line on FIG. 2, the material 5 of the lid 3 may be reinforced with nylon sail thread.

A handle 11 sewn from a strip of the same material as the upper portion of the receptacle 2 is attached along one side of the receptacle 2 to facilitate carrying of the loaded bag 1 on dry land. The handle 11 is preferably sewn onto the receptacle 2 over the side seam of its upper portion. Nylon sail thread may be used as the stitching.

The bag 1 preferably will have a receptacle 2 which is about 26 inches long and a lid 3 which is about 11 inches in diameter. While dimensions can be varied as desired, such a bag can be collapsed to lie flat and compact when not in use, and still have sufficient capacity to hold over 55 pounds of fish.

While the invention has been described with reference to a particular embodiment, variations of this embodiment may be within the scope of the invention.

What is claimed is:

1. A scuba diving catch bag comprising;
   a soft sided cylindrical receptacle having a circular opening at one end and a closed opposite end; a circular lid positionable over said opening to close it, said lid comprising an annular frame having a diameter substantially the same as said receptacle, a flexible resilient material attached to said frame and covering substantially the entire opening, said material having a thickness of minor dimension relative to the area of said opening and provided with a diametrical slit extending across the lid substantially the full diameter thereof, said resilient material being stretched taut on said annular frame with the material adjacent said slit having abutting elastic edges to be normally closed, and said slit being openable by lateral deflection upon extending an object therethrough thereby causing said resilient material to primarily laterally stretch out of the way in the general plane of the lid, hinge means connecting said lid frame to said receptacle adjacent the receptacle opening to allow opening of the receptacle to release a catch, and a wrist strap closure means attached to said lid frame diametrically opposite said hinge means and attachable to said receptacle adjacent the receptacle opening such that said lid will be kept closed when said wrist strap is attached to a diver's wrist, said closure means including a strip of flexible material configured in a closed loop for securement around said lid frame and said receptacle frame, said closed loop having a free end whereby it is securable to a diver's wrist.

2. The device of claim 1 wherein said flexible material comprises an elastic strip configured in a loop.

3. The device of claim 1 wherein said receptacle comprises a first portion formed from a non-porous, flexible material and a second portion formed from an open mesh fabric.

4. The device of claim 1 further comprising a handle mounted to said receptacle.

* * * * *